United States Patent Office 2,884,997
Patented May 5, 1959

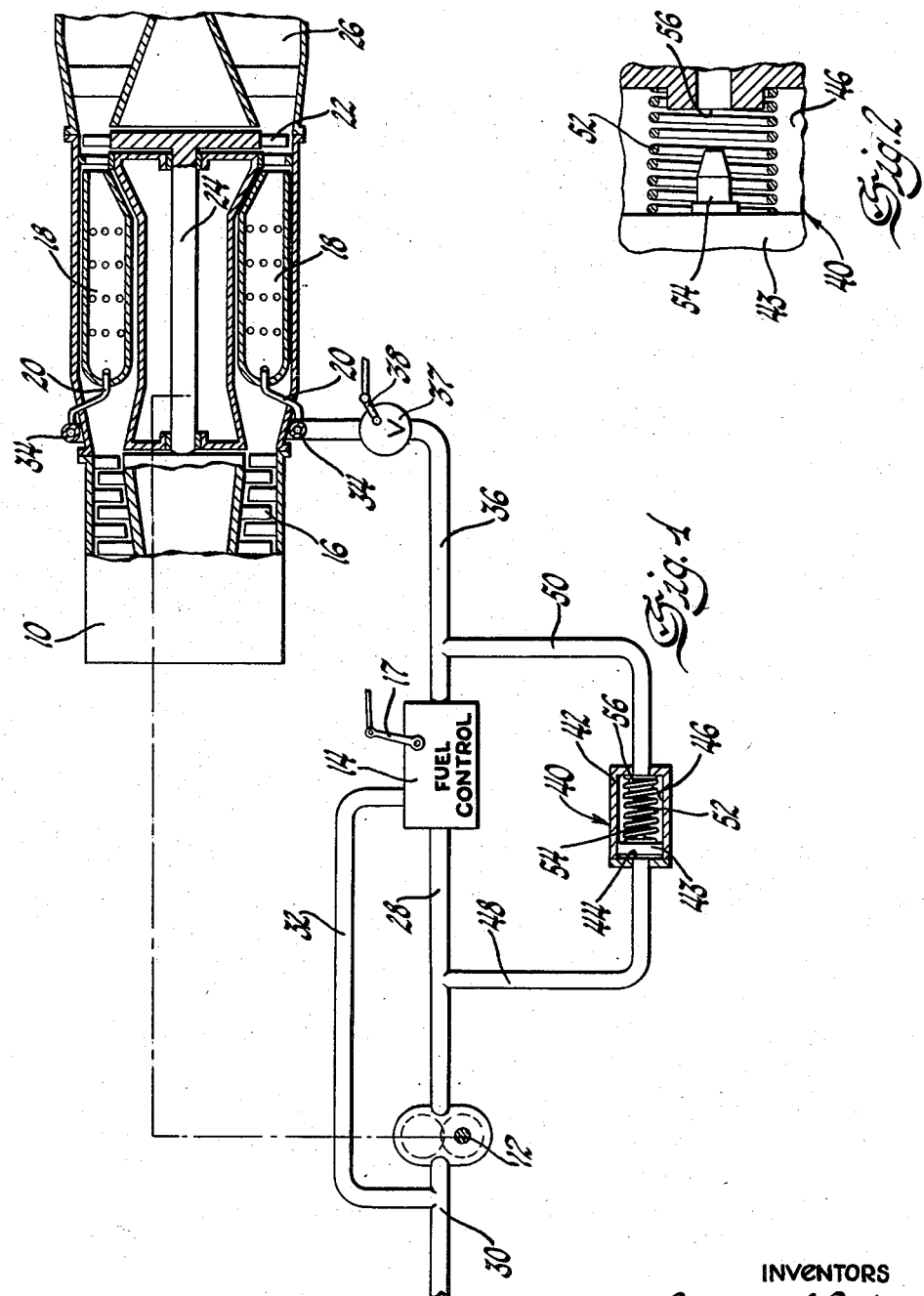

2,884,997

GAS TURBINE FUEL SYSTEM INCLUDING A STARTING ACCUMULATOR

Eugene J. Bevers and Frederick O. Zimmer, Indianapolis, Ind., assignors to General Motors Corporation, Detroit, Mich., a corporation of Delaware Application August 4, 1955, Serial No. 526,411

4 Claims. (Cl. 158—36.4)

This invention relates to gas turbine engines and more particularly to a starting aid for the fuel systems of such engines.

The usual gas turbine fuel system has a flow regulator control that restricts the fuel flow during starting to such a degree that the fuel nozzles are not immediately provided with an adequate quantity of fuel at a high enough pressure to produce good initial atomization. Since ignition cannot take place without good atomization, fuel accumulates in the engine in liquid state while the fuel pressure rises to a point where an ignitable mixture finally occurs. The accumulated fuel causes an excessive flame-up when ignition does take place and endangers the engine and surrounding objects.

An object of the invention is to provide the fuel system with an accumulator arrangement to improve turbine starting operations.

In physical form the invention includes an accumulator across the fuel control with a first chamber connected to the fuel nozzle manifold and a second chamber connected to the puel pump outlet. A movable wall separates the chambers to expand one chamber while collapsing the other and a spring is provided to bias the movable wall to charge the first chamber with fuel on turbine shutdown. The stored fuel in the first chamber is discharged by pump pressure to augment the flow through the fuel control when the turbine is started by opening a fuel manifold shut-off valve.

Further objects and advantages of the present invention will be apparent from the following description, reference being had to the accompanying drawing, wherein a preferred form of the present invention is clearly shown.

In the drawing:

Figure 1 is a partially broken away schematic representation of a gas turbine engine and fuel system incorporating the invention; and Figure 2 is an enlarged detail of a portion of Figure 1.

The invention is applied to a conventional gas turbine engine and fuel system that includes a gas turbine 10 that is supplied with fuel from the turbine or otherwise suitably driven pump 12 by way of a fuel control 14. A compressor 16 delivers air to combustors 18 for combustion with fuel supplied by nozzles 20. The combustion gases are expanded through a turbine 22 which drives the compressor 16 through a shaft 24, and the excess energy of the exhaust gases is expanded through an exhaust duct 26 to power the associated aircraft.

The fuel control 14 receives fuel by way of a pump discharge conduit 28 and returns excess fuel to a pump intake conduit 30 through a bypass conduit 32 . A fuel manifold 34 and a fuel control discharge conduit 36 supply fuel to the nozzles 20 from the fuel control 14 by way of a shut-off valve 37 having a control lever 38. The fuel control 14 has a control lever 17 and the usual internal controls to provide variable fuel delivery and thereby regulate turbine operation. The fuel flow depends upon the control lever setting, the temperature of the engine, the mass air flow through the engine and the engine r.p.m. Th fuel control restricts flow to the fuel manifold 34 and bypasses a great part of the pump output through the bypass conduit 32 at starting r.p.m.

In operation, the fuel control lever 17 is placed in starting position and the pump and turbine are suitably motored. The shut-off valve 37 is then opened and ignition suitably supplied to the combustors. The fuel control has a low delivery rate and an appreciable amount of time is required to fill the conduit 36, the manifold 34 and the nozzles 20 and to place them under sufficient pressure to provide good atomization.

The invention provides an accumulator 40 in parallel with the fuel control that includes a cylinder 42 and a reciprocable piston 43 that forms opposite or first and second chambers 44 and 46 in the cylinder. The chamber 44 is connected by a conduit 48 to the pump discharge conduit 28 and the chamber 46 is connected by a conduit 50 to the fuel control discharge conduit 36 upstream of the shut-off valve 37. A compression spring 52 biases the piston 43 to charge the chamber 46 with fuel from the pump 12 through the fuel control 14 when the turbine is shut down by closing the shut-off valve 37. The fuel control provides a restricted flow passage from conduit 28 to conduits 36 and 50 when the turbine is shut down to charge the chamber 46. The capacity of the chamber 46 is substantially the same as the capacity of the manifold 34 and the associated nozzles 20 to effectively charge the same on turbine starting. The schematic representation illustrates the accumulator in charged position after turbine shutdown.

Engine starting is accomplished by placing the fuel control 14 in start position and by suitably motoring the pump and turbine to starting speed and thereafter moving the fuel shut-off valve 37 to open position. The pump has a high capacity as it must be capable of delivering great quantities of fuel for normal high speed turbine operation and it immediately pressurizes the accumulator chamber 44 when the fuel shut-off valve 37 is opened to move the piston 43 against the spring 52 and discharge the stored fuel to the manifold and nozzles. This action takes place rapidly and compensates for the low fuel flow through the fuel control 14 by filling the lines downstream thereof. The fuel control 14 offers enough restriction to flow while the engine is operative to maintain a pressure differential between the conduits 48 and 50 that will keep the accumulator in discharged condition. The piston 43 is preferably provided with a tapered plunger 54 that enters an exit port 56 at the end of discharge of the chamber 46 to dampen the force of the piston as it reaches the end of its stroke and prevent damage to the accumulator.

While the preferred embodimnt of the invention has been described fully in order to explain the principles of the invention, it is to be understood that modifications of structure may be made by the exercise of skill in the art within the scope of the invention which is not to be regarded as limited by the detailed description of the preferred embodiment.

We claim:

1. A gas turbine fuel system comprising a supply conduit, a discharge conduit, a discharge shut-off valve for the discharge conduit, a fuel control between the conduits having a low capacity for turbine starting, and an accumulator having a first chamber connected to the supply conduit, a second chamber connected to the discharge conduit upstream of the shut-off valve, a movable wall between the chambers, spring means in the accumulator operatively biasing the movable wall in a direction for expanding the second chamber while collapsing the first chamber, the second chamber being charged by spring bias on turbine shutdown and discharged against spring bias on turbine starting to compensate for the low starting capacity of the fuel control.

2. A gas turbine fuel system comprising a supply conduit, a discharge conduit, a shut-off valve for the discharge conduit, a fuel control between the conduits having a low capacity for turbine starting, and an accumulator having a first chamber connected to the supply conduit, a second chamber connected to the discharge conduit upstream of the shut-off valve, a movable wall between the chambers for expanding one chamber while collapsing the other chamber, and a spring biasing the movable wall in a direction to charge the second chamber on turbine shutdown, the spring being overcome and the second chamber discharged on turbine starting by the fluid pressure differential across the fuel control to compensate for its low starting capacity.

3. A gas turbine fuel system comprising a manifold and associated nozzles, a pump, a flow regulating control that is incapable of delivering fuel at sufficient rate during turbine starting to accomplish immediate atomization, a shut-off valve connected to the manifold, a first conduit connecting the pump and flow regulating control, a second conduit connecting the flow regulating control and shut-off valve, and an accumulator having a first chamber connected to the first conduit, a second chamber connected to the second conduit and having substantially the same capacity as the capacity of the manifold, a movable wall between the chambers for expanding one chamber while collapsing the other chamber, and a spring biasing the movable wall in a direction to charge the second chamber with fuel from the second conduit on turbine shut down and discharge thereto on turbine starting.

4. A fuel system comprising a fuel flow regulator and a starting aid connected across the inlet and discharge sides of the regulator, the starting aid comprising a first chamber connected to the inlet side of the regulator, a second chamber connected to the discharge side of the regulator, a movable wall between the chambers for expanding one chamber while collapsing the other chamber, and a spring biasing the movable wall in a direction to collapse the first chamber, the first chamber being charged and the second chamber discharged against the spring bias on commencing fuel flow through the regulator, the second chamber being charged and the first chamber discharged by the spring bias on terminating fuel flow through the regulator.

References Cited in the file of this patent

UNITED STATES PATENTS 2,552,231     Streid et al. _____ May 8, 1951